(12) United States Patent
Taki

(10) Patent No.: US 9,783,012 B2
(45) Date of Patent: Oct. 10, 2017

(54) TIRE AIR PRESSURE MONITORING DEVICE

(71) Applicant: TOYOTA JIDOSHA KABUSHIKI KAISHA, Toyota-shi, Aichi-ken (JP)

(72) Inventor: Yuji Taki, Miyoshi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/338,590

(22) Filed: Oct. 31, 2016

(65) Prior Publication Data

US 2017/0129294 A1    May 11, 2017

(30) Foreign Application Priority Data

Nov. 10, 2015  (JP) ................................ 2015-220204

(51) Int. Cl.
*B60C 23/02* (2006.01)
*B60C 23/04* (2006.01)

(52) U.S. Cl.
CPC ...... *B60C 23/0486* (2013.01); *B60C 23/0401* (2013.01)

(58) Field of Classification Search
CPC ............ B60C 23/0486; B60C 23/0401; B60C 23/0476; B60C 23/0484; B60C 23/04; B60C 23/044; B60C 23/0408; B60C 23/02; B60C 23/20; B60C 23/0461; B60C 23/0416; B60C 23/0462; B60C 23/0444; B60C 23/0433; B60C 23/0493; B60C 23/0425; G01L 17/00; G01M 17/02; G01M 1/225; G01M 3/04

USPC ............ 340/442–449; 73/146, 146.5, 146.3; 116/34 R, 34 A, 34 B

See application file for complete search history.

(56) References Cited

U.S. PATENT DOCUMENTS

| | | | |
|---|---|---|---|
| 5,710,539 A * | 1/1998 | Iida | B60C 23/061 116/34 R |
| 6,946,954 B2 * | 9/2005 | Piech | B60C 23/061 340/442 |
| 6,982,636 B1 * | 1/2006 | Bennie | B60C 23/0408 340/438 |

(Continued)

FOREIGN PATENT DOCUMENTS

| | | |
|---|---|---|
| EP | 2199116 A2 | 6/2010 |
| JP | 2001-063326 A | 3/2001 |

(Continued)

*Primary Examiner* — Anh V La
(74) *Attorney, Agent, or Firm* — Oliff PLC

(57) ABSTRACT

A warning control unit of this tire air pressure monitoring device starts giving a driver a tire air pressure fall warning when a tire air pressure is equal to or lower than a first threshold. The warning control unit stops the warning when the tire air pressure becomes equal to or higher than a second threshold that is set based on a tire temperature in a case where the warning is being given. The warning control unit uses a constant value unrelated to a detected tire temperature as the first threshold, and uses a value obtained by adding a variable value, which is obtained by adding a positive constant value to a value that increases as a temperature difference obtained by subtracting a tire temperature at the time of the issuance of the warning from a current tire temperature increases, to the first threshold, as the second threshold.

4 Claims, 10 Drawing Sheets

(56) References Cited

U.S. PATENT DOCUMENTS

2010/0182142 A1* 7/2010 Svedberg ............ B60C 23/062
340/442
2013/0009769 A1 1/2013 Saito et al.

FOREIGN PATENT DOCUMENTS

| JP | 2010-143406 A | 7/2010 |
|---|---|---|
| JP | 2011-162025 A | 8/2011 |
| JP | 2012-171464 A | 9/2012 |

* cited by examiner

TIRE AIR PRESSURE MONITORING DEVICE

INCORPORATION BY REFERENCE

The disclosure of Japanese Patent Application No. 2015-220204 filed on Nov. 10, 2015 including the specification, drawings and abstract is incorporated herein by reference in its entirety.

BACKGROUND

1. Technical Field

The disclosure relates to a tire air pressure monitoring device that monitors an air pressure of a tire of a vehicle and that issues a warning when the air pressure of the tire falls.

2. Description of Related Art

There is a tire air pressure monitoring device that issues a warning that a tire air pressure has fallen (referred to hereinafter as "a tire air pressure fall warning" or simply as "a warning" in some cases) when the detected tire air pressure becomes lower than a warning issuance threshold. This tire air pressure monitoring device stops (cancels) the warning if the tire air pressure becomes higher than "a warning cancellation threshold that is larger than the warning issuance threshold" when the warning has been issued.

To describe more concretely, the tire air pressure rises as a tire temperature (the temperature of air in a tire) rises. The tire temperature rises due to the running of a vehicle. Thus, as shown in FIG. 12, the tire air pressure monitoring device sets both the warning issuance threshold (see a solid line L5) and the warning cancellation threshold (see an alternate long and short dash line L6) in such a manner as to increase as the tire temperature rises (e.g., see Japanese Patent Application Publication No. 2010-143406 (JP 2010-143406 A)).

By the way, in general, an operator makes an adjustment such that the tire air pressure coincides with "a pressure Pr that is recommended when the tire temperature is equal to an outside air temperature". This pressure Pr is referred to as "a placard pressure" or "a recommended set pressure". Thus, the tire air pressure monitoring device issues a warning if the tire air pressure becomes equal to or lower than "a predetermined ratio of the placard pressure Pr (=a·Pr, $0.7 \leq a \leq 0.8$)" when the tire temperature is equal to a standard outside air temperature Tr (see a point Q5 in FIG. 12). Accordingly, the tire air pressure monitoring device sets a value that passes through the point Q5 and that increases as the tire temperature rises, as the warning issuance threshold.

SUMMARY OF THE INVENTION

Therefore, according to the tire air pressure monitoring device, there is a problem in that no warning is issued even if the tire air pressure becomes lower than "the predetermined ratio (=a·Pr) of the placard pressure Pr" when the tire temperature is lower than the standard outside air temperature Tr (see a point Q6 in FIG. 12).

Thus, the inventor considers setting the warning issuance threshold to a constant pressure (e.g., the predetermined ratio of the placard pressure Pr) regardless of the tire temperature. However, in this case, if the warning cancellation threshold is set as in the case of the aforementioned tire air pressure monitoring device, a difference ΔH between the warning issuance threshold and the warning cancellation threshold is small when the tire temperature is low, as is understood from FIG. 12. As a result, there arises a problem of the frequent occurrence of the issuance and stop of a warning.

The disclosure provides a tire air pressure monitoring device that ensures that a warning is issued without delay when a tire air pressure becomes equal to or lower than a constant value even in the case where a tire temperature is low and that the possibility of frequent repetition of the issuance and stop of the warning is low.

An aspect of the disclosure relates to a tire air pressure monitoring device that is equipped with an air pressure sensor that detects a tire air pressure as an air pressure of a tire of a vehicle, a temperature sensor that detects a tire temperature as a temperature of the tire, and a warning control unit.

The warning control unit starts giving a driver a warning that the tire air pressure has fallen, when the detected tire air pressure is equal to or lower than a first threshold, and stops the warning when the detected tire air pressure becomes equal to or higher than "a second threshold that is set based on the detected tire temperature" in a case where the warning is being given.

Furthermore, the warning control unit uses a constant value unrelated to the detected tire temperature, as the first threshold.

Accordingly, the aforementioned tire air pressure monitoring device can issue a warning without delay when the tire air pressure becomes equal to or lower than the first threshold even in the case where the tire temperature is very low. On the other hand, the issuance and stop of a warning may frequently occur unless the second threshold is appropriately set.

Thus, the warning control unit acquires the tire temperature detected at a moment of start of the warning, as a warning issuance temperature, and uses a value obtained by adding a variable value, which is obtained by adding a positive constant value to a value that increases as a temperature difference obtained by subtracting the warning issuance temperature from the currently detected tire temperature increases, to the first threshold, as the second threshold.

According to this, the second threshold increases as the tire temperature rises. Accordingly, the possibility of stop of a warning due to excess of the second threshold by the tire air pressure despite a failure to adjust the tire air pressure can be reduced when the tire air pressure rises as a result of a rise in the tire temperature. Accordingly, the possibility of frequent occurrence of the issuance and stop of a warning can be reduced. Furthermore, even in the case where the tire temperature is low, the difference between the second threshold and the first threshold is equal to or larger than the positive constant value as long as the tire temperature is equal to or higher than the tire temperature at the time of the start of the warning (the warning issuance temperature). Accordingly, the possibility of frequent occurrence of the issuance and stop of a warning can be reduced.

The warning control unit may limit the second threshold such that a difference value obtained by subtracting the first threshold from the second threshold does not become equal to or larger than a first difference upper limit when a speed of the vehicle is equal to or lower than a predetermined speed, and may limit the second threshold such that the difference value does not become equal to or larger than a second difference upper limit that is larger than the first difference upper limit when the speed of the vehicle is higher than the predetermined speed.

In this manner, the circumstances where a warning continues even when the tire air pressure becomes very high can be avoided. In consequence, the tire air pressure can be prevented from being adjusted in such a manner as to become excessively high by an operator or the like. It should be noted, however, that since the tire temperature is likely to become high at the time of high-speed running when the vehicle speed exceeds the predetermined vehicle speed, the tire air pressure is likely to become high even in the case where the tire air pressure is not adjusted after the issuance of a warning. In consequence, the second difference upper limit is set to a value that is larger than the first difference upper limit. As a result, the possibility of occurrence of the circumstances where the driver develops a feeling of strangeness because a warning ends in running at high speed despite the issuance of the warning during stoppage of the vehicle can be reduced.

The warning control unit may be configured to acquire the detected tire air pressure as an adjustment air pressure when the air pressure of the tire is adjusted, and limit the second threshold such that the second threshold does not become equal to or larger than an upper limit that is determined based on the acquired adjustment air pressure.

According to this aspect of the disclosure, the circumstances where a warning continues even in the case where the tire air pressure becomes equal to a value that is sufficiently higher than a tire air pressure at the time of an immediately preceding adjustment of the tire air pressure can be avoided. In consequence, the possibility of occurrence of the circumstances where the driver develops a feeling of strangeness can be reduced.

The warning control unit may be configured to continue the warning instead of stopping the warning regardless of the detected tire air pressure, until a predetermined time lapses from start of the warning.

In this manner, the occurrence of the circumstances where the start and stop of a warning is frequently repeated can be reliably avoided.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A tire air pressure monitoring device according to each of the embodiments of the disclosure will be described hereinafter with reference to the drawings.

First Embodiment (Configuration)

Figure 1:
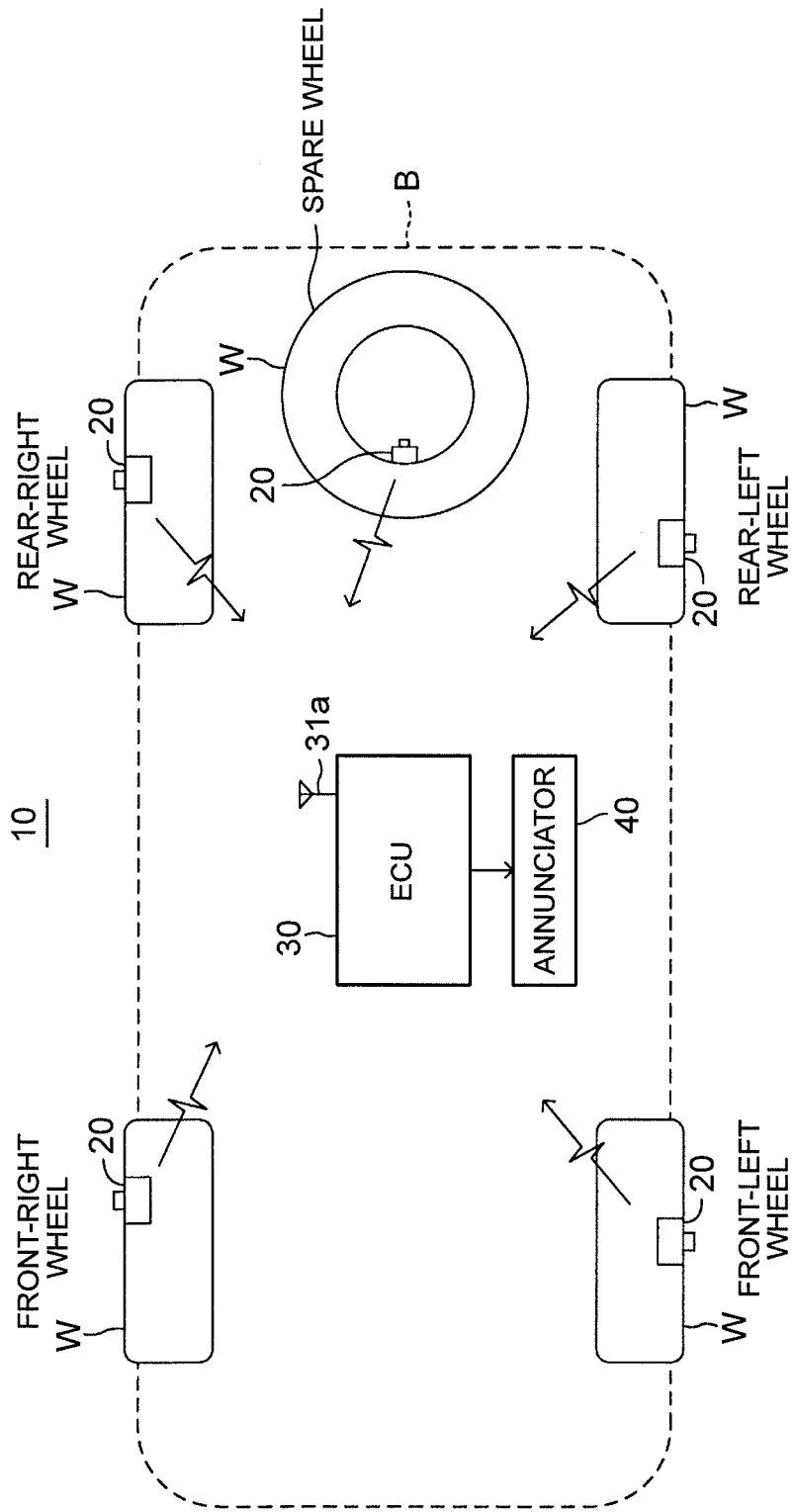
FIG. 1 is a schematic block diagram of a tire air pressure monitoring device (a first device) according to the first embodiment of the disclosure.

The tire air pressure monitoring device according to the first embodiment of the disclosure (hereinafter referred to as "the first device") is applied to a vehicle 10 shown in FIG. 1. As shown in FIG. 1, the first device is equipped with tire air pressure sensor units (hereinafter referred to as "sensor units") 20, a tire air pressure annunciation control unit (hereinafter referred to as "an ECU") 30, and an annunciator 40.

Figure 2:
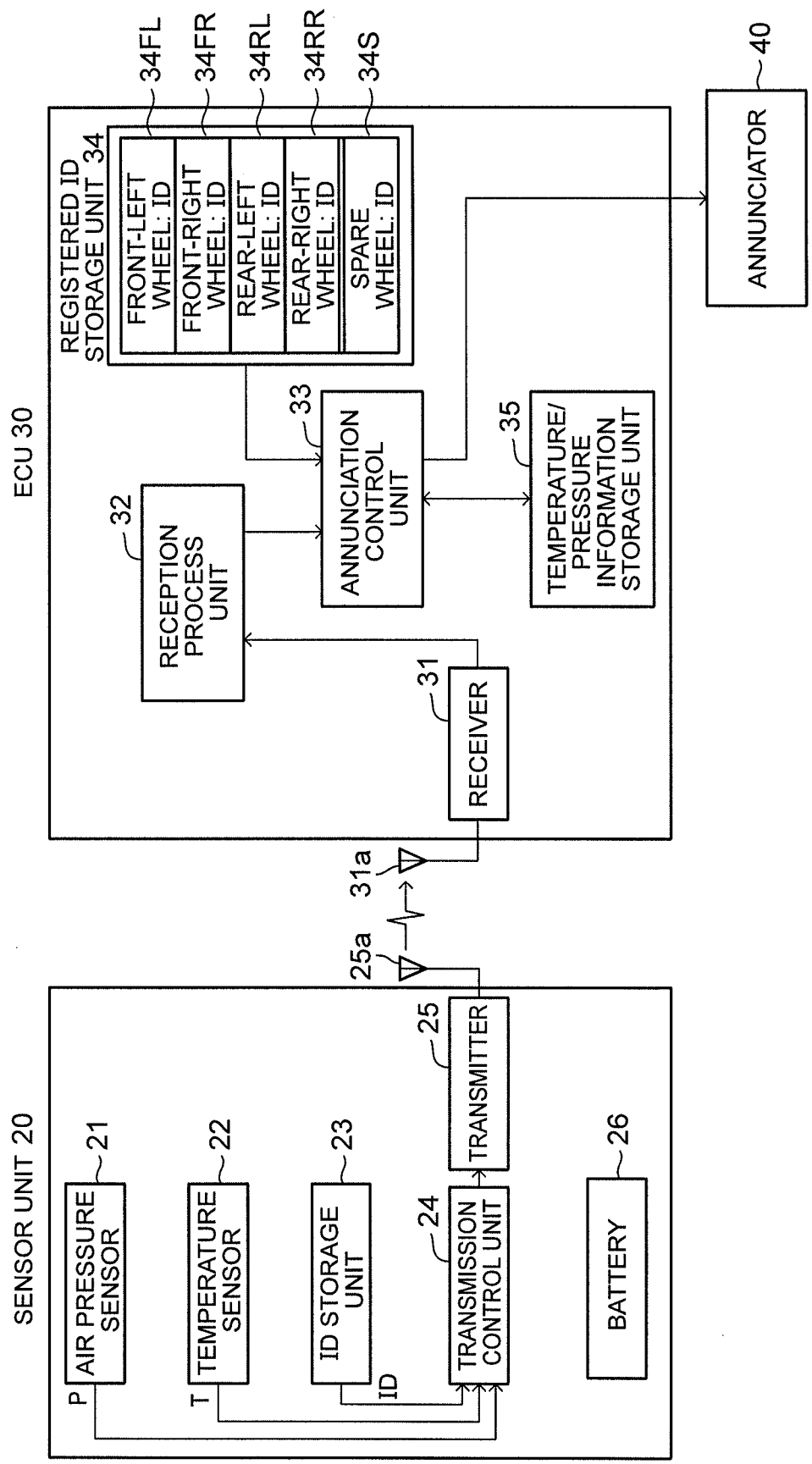
FIG. 2 is a block diagram of the tire air pressure monitoring device shown in FIG. 1.

The sensor units 20 are attached to tire air injection valves (not shown) of respective wheels (a front-right wheel, a front-left wheel, a rear-right wheel, a rear-left wheel and a spare wheel) W. As shown in FIG. 2, each of the sensor units 20 is equipped with an air pressure sensor 21, a temperature sensor 22, an ID storage unit 23, a transmission control unit 24, a transmitter 25 and a battery 26.

The air pressure sensor 21 detects an air pressure of the tire to which the air pressure sensor 21 is fitted, and outputs a detection signal representing a tire air pressure P to the transmission control unit 24. The temperature sensor 22 detects a temperature of the tire to which the temperature sensor 22 is fitted (more precisely, a temperature of air in the tire), and outputs a detection signal representing a tire temperature T to the transmission control unit 24. The ID storage unit 23 is a non-volatile memory that stores a sensor ID as identification information on the sensor unit 20, and outputs the sensor ID to the transmission control unit 24.

The transmission control unit 24 is equipped with a microcomputer as a main part thereof. The transmission control unit 24 generates transmission data including the tire air pressure P detected by the air pressure sensor 21, the tire temperature T detected by the temperature sensor 22, and the sensor ID stored by the ID storage unit 23. The transmission control unit 24 outputs the transmission data to the transmitter 25 at a predetermined transmission timing, by executing a transmission control routine (not shown) that is separately executed.

Upon receiving the transmission data output from the transmission control unit 24, the transmitter 25 converts the transmission data into a radio signal, and transmits the radio signal to the ECU 30 via a transmission antenna 25a. Incidentally, information transmitted from the transmitter 25 by the radio signal (i.e., the transmission data output from the transmission control unit 24 to the transmitter 25) will be referred to hereinafter as "wheel information" in some cases.

The battery 26 functions as a power supply that supplies operational power to respective electric loads in the sensor unit 20.

As shown in FIG. 1, the ECU 30 is fixed to a vehicle body B of the vehicle 10. The ECU 30 is equipped with a microcomputer and a communication circuit, as main parts thereof. As shown in FIG. 2, from a functional point of view, the ECU 30 is equipped with a receiver 31, a reception process unit 32, an annunciation control unit 33, an registered ID storage unit 34 and a temperature/pressure information storage unit 35. Furthermore, the ECU 30 is connected to the annunciator 40 that is provided in the vicinity of a driver seat.

Incidentally, the ECU is the abbreviation of an electronic control unit. The ECU is an electronic control unit that has, as a main component, a microcomputer including a CPU, a ROM, a RAM, a non-volatile memory, an interface and the like. The CPU realizes various functions by executing instructions (routines) stored in the memory (the ROM).

The receiver 31 receives a radio signal transmitted from each of the sensor units 20 via a reception antenna 31a. Every time the receiver 31 receives a radio signal, the reception process unit 32 extracts data representing the sensor ID, the tire air pressure P and the tire temperature T from the radio signal. Furthermore, the reception process unit 32 outputs the extracted data representing "the sensor ID, the tire air pressure P and the tire temperature T" to the annunciation control unit 33.

The annunciation control unit 33 creates annunciation data representing the tire air pressures P of the five wheels including the spare wheel according to wheel positions, based on the data input from the reception process unit 32, with reference to "a corresponding relationship between the registered sensor ID and the wheel position" stored in the registered ID storage unit 34. The annunciation control unit 33 outputs the created annunciation data to the annunciator 40. Furthermore, the annunciation control unit 33 compares the tire air pressure P of each of the wheels W with a warning issuance threshold Pa1. When the tire air pressure P is equal to or lower than the warning issuance threshold Pa1, the annunciation control unit 33 outputs air pressure fall wheel position data specifying the position of the wheel W in which the tire air pressure has fallen and a warning command signal to the annunciator 40. This warning issuance threshold Pa1 will be described later in detail.

The registered ID storage unit 34 is a non-volatile memory that stores the sensor ID's of the sensor units 20 that are attached to the tires of the respective wheels W, according to the wheel positions. The registered ID storage unit 34 is equipped with ID storage areas 34FL, 34FR, 34RL, 34RR and 34S that store the sensor ID's that are set in advance for the sensor units 20 that are attached to the front-left wheel, the front-right wheel, the rear-left wheel, the right-rear wheel and the spare wheel respectively. The sensor ID's that are stored in the registered ID storage unit 34 will be referred to hereinafter as "registered sensor ID's".

As shown in FIG. 1, the annunciator 40 is fixed to the vehicle body B of the vehicle 10. The annunciator 40 is equipped with a display that is provided at a position visible from the driver seat, and a display circuit that drives the display. The annunciator 40 displays a tire air pressure monitoring screen on the display in accordance with the annunciation data (including the air pressure fall wheel position data and the warning command signal) output from the annunciation control unit 33.

Figure 3:
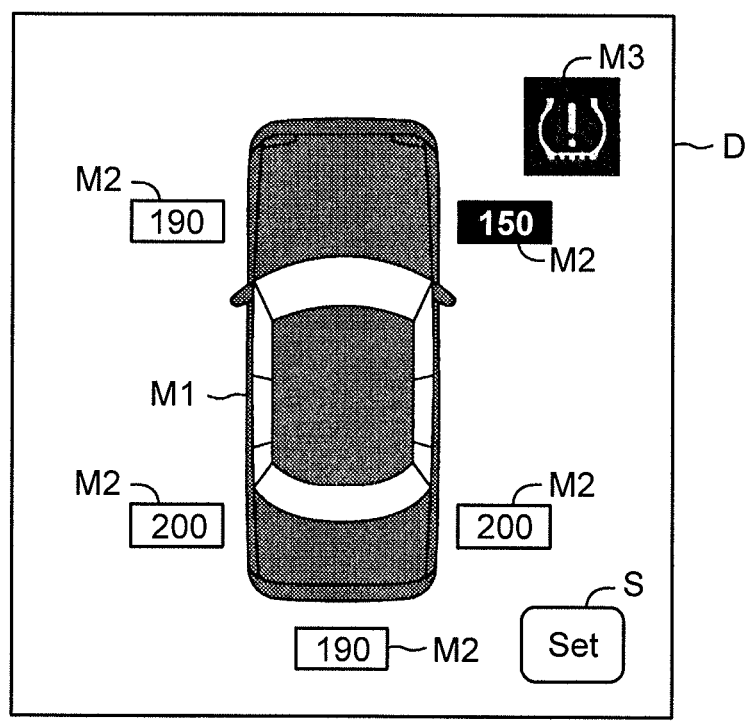
FIG. 3 is a view representing a monitoring screen that is displayed by an annunciator shown in FIG. 1.

FIG. 3 represents a tire air pressure monitoring screen D displayed by the display of the annunciator 40. The screen D displays a vehicle body mark M1 representing a plan view of the vehicle body, air pressure numerical value display portions M2 that are provided in such a manner as to correspond to the respective wheel positions and that display tire air pressures in the form of numerical values, and a warning mark M3 for urging the driver to pay attention. Furthermore, the screen D is equipped with a touch-type switch S that informs the annunciation control unit 33 that the operator, the driver or the like has adjusted the air pressures of the tires. When the switch S is operated, the tire air pressures P and the tire temperatures T of the respective wheels W at the time when the tire air pressures are adjusted (when the switch S is operated and when the tire air pressures are initialized) are associated with the sensor ID's and then stored into the temperature/pressure information storage unit 35.

The annunciator 40 displays tire air pressures in the form of numerical values at the air pressure numerical value display portions M2, based on the annunciation data input from the annunciation control unit 33. Furthermore, the annunciator 40 changes, based on the air pressure fall wheel position data transmitted from the annunciation control unit 33, the display pattern of the air pressure numerical value display portion M2 at the corresponding wheel position (e.g., reverses the background color and font color from those at the other wheel positions). In addition, the annunciator 40 lights up the warning mark M3 based on a warning command signal. The driver can visually recognize the warning mark M3 only when the warning mark M3 is lit up. The driver cannot visually recognize the warning mark M3 when the warning mark M3 is put out. Accordingly, the driver can recognize which one of the wheels W has a fallen tire air pressure, in conjunction with the air pressure value thereof.

The temperature/pressure information storage unit 35 is a non-volatile memory that stores "the tire air pressure P and the tire temperature T" at the time when the tire air pressure is adjusted, "the tire air pressure P and the tire temperature T" at the time when an air pressure warning is issued, and the like.

(Outline of Operation of First Device) As described above, the first device compares the tire air pressures P of the five wheels including the spare wheel with the warning issuance threshold Pa1. When the tire air pressure P of any one of the wheels is equal to or lower than the warning issuance threshold Pa1, the first device gives the driver a warning that the tire air pressure has fallen, by lighting up the warning mark M3. It should be noted, however, that the outline of the operation of the first device will be described hereinafter focusing attention on a specific one of the wheels, for the sake of simplified explanation. Incidentally, the warning that the tire air pressure has fallen may be referred to as "a tire air pressure fall warning" or simply as "a warning".

The first device starts a warning when the tire air pressure P is equal to or lower than the warning issuance threshold Pa1. The warning issuance threshold Pa1 may be referred to as "a first threshold" for the sake of convenience. The warning issuance threshold Pa1 is a constant value that does not depend on the tire temperature T. To describe more concretely, the warning issuance threshold Pa1 is determined by an expression (1) shown below.

In the expression (1), Pr is a tire air pressure (a constant value) that is recommended to be set/adjusted when the tire air pressure is adjusted, and is referred to as a recommended set pressure Pr or a placard pressure Pr. The recommended set pressure Pr differs depending on the vehicle type and/or the tire. In the present example, the recommended set pressure Pr is 200 (kPa). In the expression (1), a is normally set to a predetermined value that is equal to or larger than 0.7 and equal to or smaller than 0.8. In the present example, a is 0.8, and accordingly, the warning issuance threshold Pa1 is 160 (kPa).

$$Pa1 = a \cdot Pr \quad (1)$$

That is, the first device starts a warning when the tire air pressure P becomes equal to or lower than "a pressure corresponding to the predetermined ratio a of the recommended set pressure Pr".

During the issuance of a warning, the first device stops (cancels) the warning when the tire air pressure P becomes equal to or higher than a warning cancellation threshold Pc1. The warning cancellation threshold Pc1 may be referred to as "a second threshold" for the sake of convenience. The warning cancellation threshold Pc1 is determined by expressions (2) and (3) shown below. In the expressions (2) and (3), α is a value that is referred to as "a correction value", and is equivalent to a difference value obtained by subtracting the warning issuance threshold Pa1 as the first threshold from the warning cancellation threshold Pc1 as the second threshold. The correction value α is set to "0" when a value calculated based on the expression (3) becomes smaller than "0" (i.e., negative). That is, the lower limit of the correction value α is "0".

$$Pc1 = Pa1 + \alpha \quad (2)$$

$$\alpha = (Tnow - Ta1) + h \quad (3)$$

In the expression (3), Tnow is the tire temperature (a currently detected tire temperature) T at the current moment, and Ta1 is the tire temperature T at the time when a warning is started, and is also referred to as "a warning issuance temperature Ta1". In the expression (3), a coefficient k, which is a positive value, is an amount of increase in the tire air pressure in the case where the tire temperature has risen by unit temperature (i.e., a ratio of increase of the tire air pressure to the tire temperature) and is expressed in the unit of (kPa/° C.). In the present example, from an experimental result indicating that the tire air pressure rises (or falls) by 10 kPa when the tire temperature rises (or falls) by 10° C., the coefficient k is set to 1 (kPa/° C.). In the expression (3), h is a predetermined positive constant value (a fixed value), and is also referred to as a hysteresis. In the present example, the hysteresis is set to 15 (kPa). In consequence, α is a value that increases as "the temperature difference obtained by subtracting the warning issuance temperature Ta1 from the tire temperature Tnow at the current moment" increases. This "value that increases as the temperature difference increases" includes a negative value whose absolute value increase as the temperature difference decreases when the temperature difference is smaller than a predetermined negative value (i.e., as the absolute value of the temperature difference increases when the temperature difference is a negative value).

Figure 4:
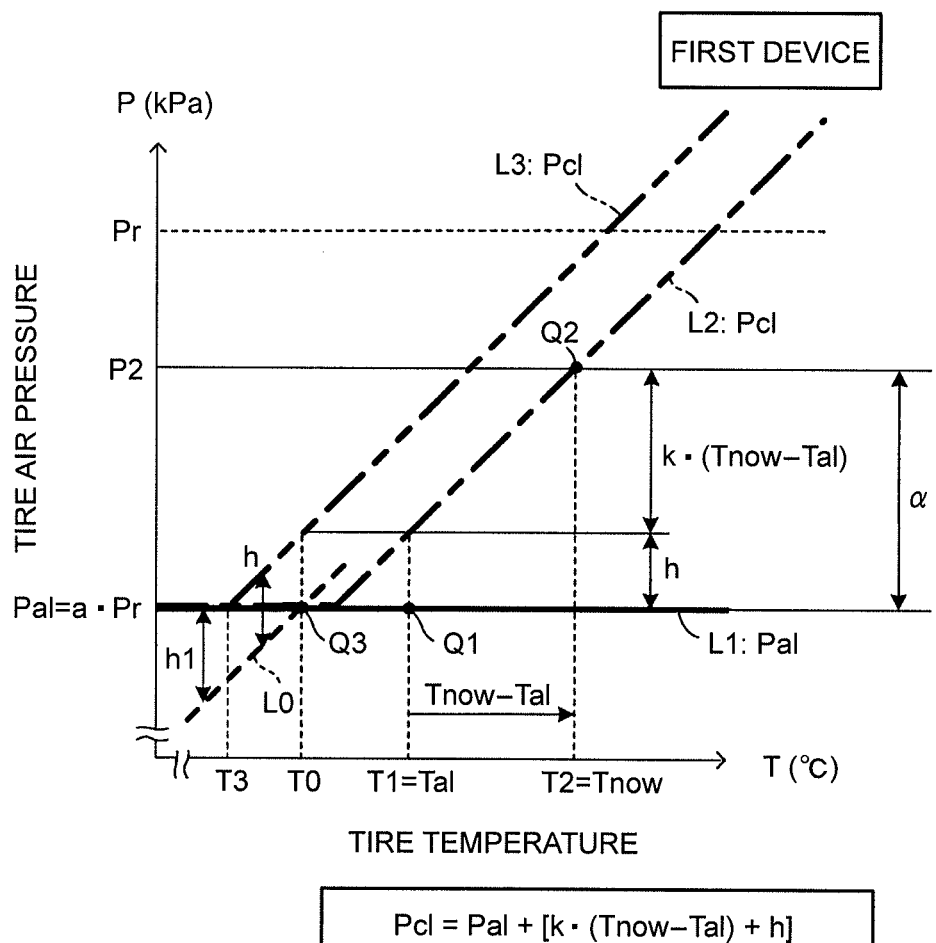
FIG. 4 is a graph showing a relationship between "a warning issuance threshold and a warning cancellation threshold" that are set by an annunciation control unit of the tire air pressure monitoring device shown in FIG. 1 and a tire temperature.

Accordingly, the first device starts a warning if the tire air pressure P becomes equal to or lower than the warning issuance threshold Pa1 when the tire temperature T is equal to the tire temperature T1, for example, as indicated by a point Q1 in FIG. 4. In this case, the warning cancellation threshold Pc1 changes as indicated by an alternate long and short dash line L2. In consequence, the first device stops (cancels) the warning if the tire air pressure P becomes equal to or higher than a tire air pressure P2 that is equal to the warning cancellation threshold Pc1 when the tire temperature T is equal to the tire temperature T2, for example, as indicated by a point Q2 in FIG. 4.

Furthermore, the first device starts a warning if the tire air pressure P becomes equal to or lower than the warning issuance threshold Pa1 when the tire temperature T is equal to the tire temperature T0, for example, as indicated by a point Q3 in FIG. 4. In this case, the warning issuance temperature Ta1 is equal to the tire temperature T0, and the warning cancellation threshold Pc1 changes as indicated by an alternate long and two short dash line L3.

In consequence, according to the first device, a warning is immediately issued if the tire air pressure P falls below the warning issuance threshold Pa1 as a constant value even when the tire temperature is low. In addition, according to the first device, at least the hysteresis "h" is provided between the warning cancellation threshold Pc1 and the warning issuance threshold Pa1 as long as the tire temperature is equal to or higher than the warning issuance temperature Ta1 (=T0). Therefore, the frequency of repeated occurrence of the issuance and stop of a warning can be reduced.

Incidentally, as shown in FIG. 4, when the tire temperature T is lower than the warning issuance temperature Ta1 (=T0), the hysteresis is equal to or larger than "0" and smaller than "h". In general, however, the tire temperature T rises when the vehicle 10 runs. Therefore, the hysteresis rarely becomes equal to "such a small value".

Furthermore, as shown in FIG. 4, the first device sets the lower limit of the warning cancellation threshold Pc1 to the same value as the warning issuance threshold Pa1. On the other hand, when the tire temperature T becomes lower than the warning issuance temperature Ta1 (=T0), the tire air pressure P falls at the above-mentioned ratio (10 kPa/10° C.) as indicated by a broken line L0. In consequence, when the tire temperature T falls from the tire temperature T0, the difference between the tire air pressure P and the warning cancellation threshold Pc1 is equal to the hysteresis "h" until the tire temperature T reaches a tire temperature T3. Furthermore, when the tire temperature T becomes lower than the tire temperature T3, the difference between the tire air pressure P and the warning cancellation threshold Pc1 becomes equal to a difference "h1" that is larger than the hysteresis "h". In consequence, even when the tire temperature T falls after the issuance of a warning, it is improbable that the warning once issued will be canceled. Accordingly, even in the case where the warning issuance threshold Pa1 and the warning cancellation threshold Pc1 coincide with each other when the tire temperature T is lower than the warning issuance temperature Ta1, no problems arises from a practical point of view.

In addition, the first device is configured to continue a warning instead of stopping the warning until the lapse of a predetermined time (a constant threshold time, for example, five minutes) Ts after the issuance of the warning, regardless of the value of the tire air pressure. Accordingly, the first device can more reliably avoid the frequent repetition of the issuance and cancellation of a warning.

(Concrete Operation) Next, the concrete operation of the first device will be described. The CPU of the ECU 30 executes "an air pressure warning routine" shown in FIG. 5 in the form of a flowchart, every time a constant length of time elapses. The CPU realizes the function of the annunciation control unit 33 by executing this routine. Incidentally, although the CPU actually executes this routine for each of the wheels, the operation of the CPU will be described hereinafter focusing attention on one of the wheels.

Figure 5:
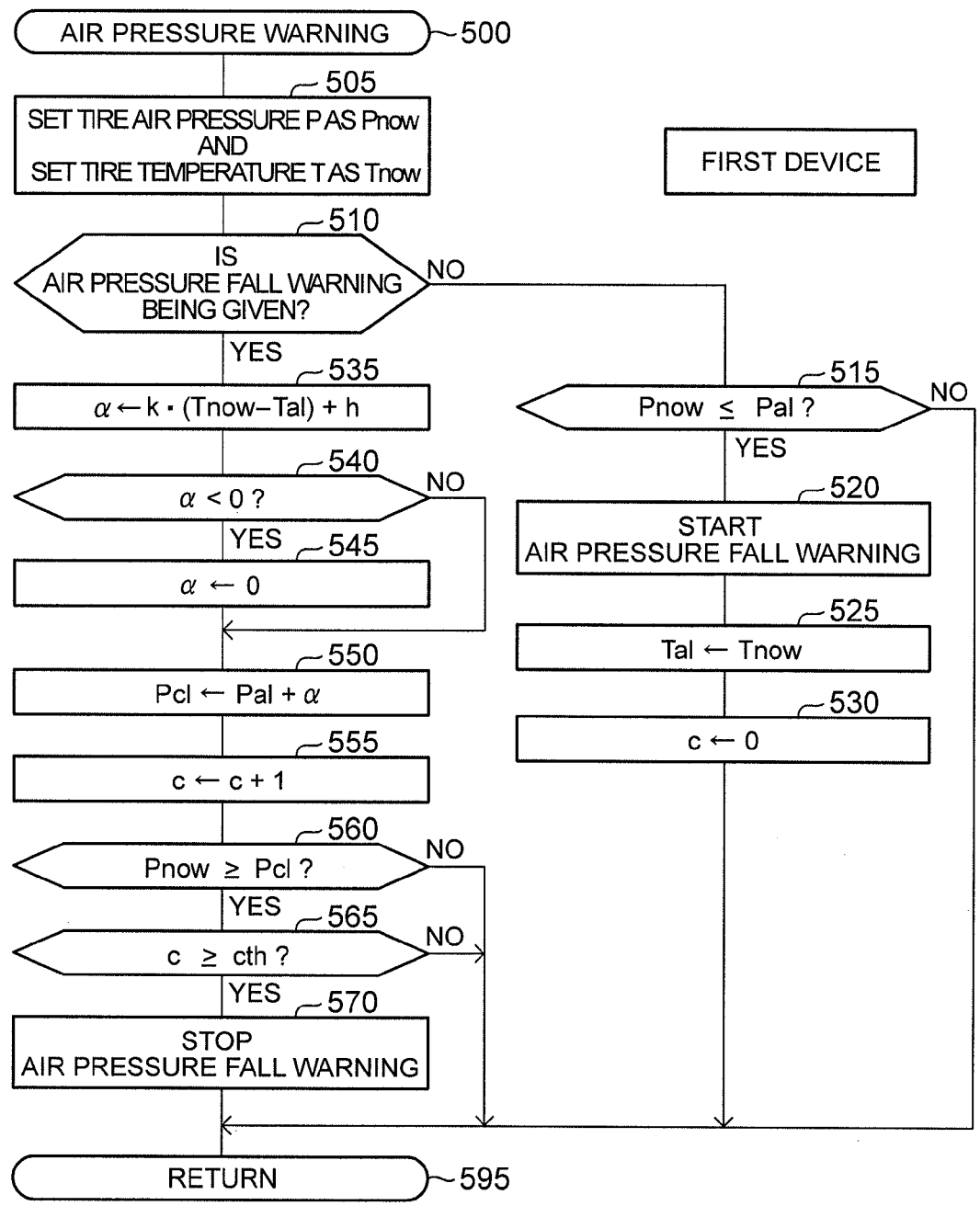
FIG. 5 is a flowchart showing "an air pressure warning routine" that is executed by an ECU of the tire air pressure monitoring device shown in FIG. 1.

With the advent of a predetermined timing, the CPU starts the process from step 500 of FIG. 5, and proceeds to step 505 to acquire the tire air pressure P of the wheel W on which attention is focused as a current tire air pressure Pnow, and to acquire the tire temperature T of the wheel W on which attention is focused as a current tire temperature Tnow.

Subsequently, the CPU proceeds to step 510 to determine whether or not a warning has been issued at the current moment. In general, the tire air pressure is normal, so no warning has been issued. In consequence, the CPU regards the result of the determination in step 510 as "No", and proceeds to step 515 to determine whether or not the tire air pressure Pnow is equal to or lower than the warning issuance threshold Pa1. When the tire air pressure is normal, the tire air pressure Pnow is higher than the warning issuance threshold Pa1. In consequence, the CPU regards the result of the determination in step 515 as "No", and directly proceeds to step 595 to temporarily end the present routine.

In this manner, when no warning is issued, the CPU repeats the processing procedures of steps 505 to 515. In consequence, it continues to be monitored whether or not the tire air pressure Pnow has become equal to or lower than the warning issuance threshold Pa1.

It is now assumed that the tire air pressure Pnow has become equal to or lower than the warning issuance threshold Pa1 for some reason. In this case, upon proceeding to step 515, the CPU regards the result of the determination in step 515 as "Yes", sequentially executes the processing procedures of steps 520 to 530, which will be described later, and proceeds to step 595.

Step 520: The CPU starts an air pressure fall warning. That is, the CPU lights up the warning mark M3.

Step 525: The CPU stores the current tire temperature Tnow as the warning issuance temperature Ta1.

Step 530: The CPU sets (clears) the value of a counter c for measuring a warning duration time to "0".

After that, the CPU starts the process from step 500 again, and proceeds to step 510 via step 505. In this case, a warning is issued. In consequence, the CPU regards the result of the determination in step 510 as "Yes", and proceeds to step 535 to calculate the correction value α according to the aforementioned expression (3).

Subsequently, the CPU proceeds to step 540 to determine whether or not the correction value α is smaller than "0". If the correction value α is smaller than "0", the CPU regards the result of the determination in step 540 as "Yes", proceeds to step 545 to set the correction value α to "0", and proceeds to step 550. In contrast, if the correction value α is equal to or larger than "0", the CPU regards the result of the determination in step 540 as "No", and directly proceeds to step 550. The correction value α is limited to a value that is equal to or larger than "0" through the processing procedures of this step 540 and this step 545.

The CPU calculates the warning cancellation threshold Pc1 according to the aforementioned expression (2) in step 550. Subsequently, the CPU proceeds to step 555 to increase the value of the counter c by "1". After that, the CPU proceeds to step 560 to determine whether or not the tire air pressure Pnow is equal to or higher than the warning cancellation threshold Pc1.

For example, when the tire air pressure Pnow is equal to or higher than the warning cancellation threshold Pc1 as a result of an adjustment of the tire air pressure, the CPU regards the result of the determination in step 560 as "Yes", and proceeds to step 565 to determine whether or not the value of the counter c is equal to or longer than a threshold duration time cth. This threshold duration time cth is set such that the elapsed time since the start of a warning coincides with the foregoing predetermined time Ts when the value of the counter c becomes equal to the value cth.

If the value of the counter c is equal to or longer than the threshold duration time cth, the CPU regards the result of the determination in step 565 as "Yes", and proceeds to step 570 to stop (cancel) the warning. That is, the CPU puts out the warning mark M3.

On the other hand, if the tire air pressure Pnow is not equal to or higher than the warning cancellation threshold Pc1 when the CPU executes the processing procedure of step 560, the CPU regards the result of the determination in step 560 as "No", and directly proceeds to step 595 to temporarily end the present routine. In consequence, the warning is continued in this case.

Furthermore, if the value of the counter c is not equal to or longer than the threshold duration time cth when the CPU executes the processing procedure of step 565, the CPU regards the result of the determination in step 565 as "No", and directly proceeds to step 595 to temporarily end the present routine. In consequence, the warning is continued in this case as well.

As described above, the first device uses "the constant value a·Pr unrelated to the tire temperature T" as the warning issuance threshold Pa1, and uses "a value obtained by adding the variable value (the correction value) α, which is obtained by adding the positive constant value h to the value k·(Tnow−Ta1) that increases as a temperature obtained by subtracting the warning issuance temperature Ta1 from the currently detected tire temperature Tnow increases, to the warning issuance threshold Pa1" as the warning cancellation threshold Pc1. Furthermore, the variable value α is set to a value that is larger than 0. That is, the warning cancellation threshold Pc1 is set to a value that is larger than the warning issuance threshold Pa1.

In consequence, according to the first device, even in the case where the tire temperature Tnow is very low, a warning is issued without delay when the tire air pressure Pnow becomes equal to or lower than "the constant warning issuance threshold Pa1 that does not depend on the tire temperature". Furthermore, according to the first device, the warning cancellation threshold Pc1 is set as described above. Therefore, the possibility of frequent occurrence of the issuance and stop of a warning can be reduced.

Second Embodiment

Next, the tire air pressure monitoring device according to the second embodiment of the disclosure (hereinafter referred to as "the second device") will be described. The second device is different from the first device only in that an upper limit is provided for the correction value α. This difference will be described hereinafter.

Figure 6:
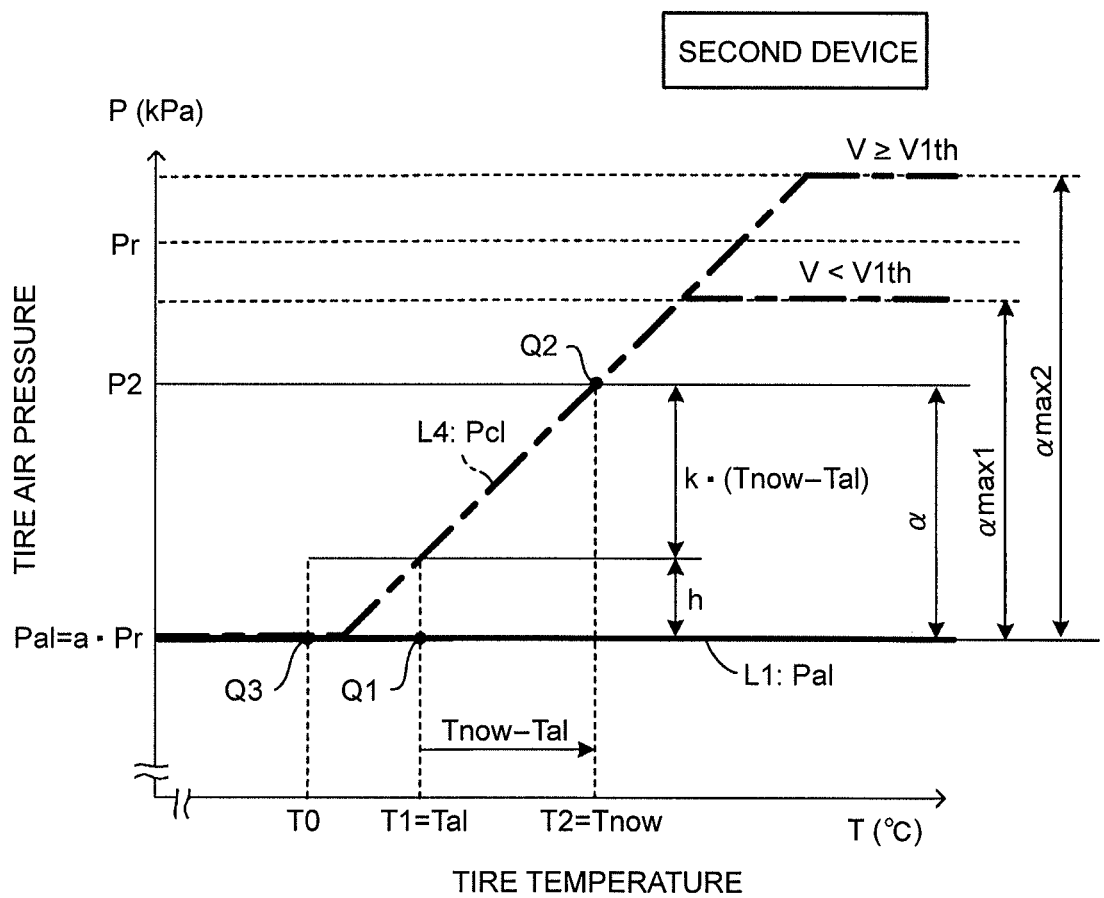
FIG. 6 is a graph showing a relationship between "a warning issuance threshold and a warning cancellation threshold" that are set by an annunciation control unit of a tire air pressure monitoring device (a second device) according to the second embodiment of the disclosure and a tire temperature.

As shown in FIG. 6, the second device sets an upper limit corresponding to the vehicle speed V for the correction value α. That is, the second device sets an upper limit αmax1 for the correction value α when the vehicle speed V is lower than a first predetermined vehicle speed V1th (e.g., 120 (km/h)) (sets the correction value α to the upper limit αmax1 when the correction value α is equal to or larger than the upper limit αmax1). The upper limit αmax1 is also referred to as "a first difference upper limit αmax1" for the sake of convenience. The first difference upper limit αmax1 is set to a value that is slightly smaller than a value obtained by subtracting the warning issuance threshold Pa1 from the recommended set pressure Pr (a value that is smaller than the value obtained through subtraction by a first predetermined value). In the present example, the first difference upper limit αmax1 is 30 (kPa).

Furthermore, the second device sets an upper limit αmax2 for the correction value α when the vehicle speed V is equal to or higher than the first predetermined vehicle speed V1th (sets the correction value α to the upper limit αmax2 when the correction value α is equal to or larger than the upper limit αmax2). The upper limit αmax2 is also referred to as "a second difference upper limit αmax2" for the sake of convenience. The upper limit αmax2 is set to a value that is slightly larger than a value obtained by subtracting the warning issuance threshold Pa1 from the recommended set pressure Pr (a value that is larger than the value obtained through subtraction by a second predetermined value). In the present example, the second difference upper limit αmax2 is 50 (kPa).

According to the second device, the circumstances where a warning continues when the tire air pressure becomes excessively high with respect to the recommended set pressure Pr can be avoided. In consequence, the operator can be prevented from adjusting the tire air pressure such that the tire air pressure becomes excessively high. It should be noted, however, that since the tire temperature is likely to become high at the time of high-speed running when the vehicle speed V exceeds the first predetermined vehicle speed V1th, the tire air pressure P is likely to exceed the recommended set pressure Pr even in the case where the tire air pressure is not adjusted after the issuance of a warning. In consequence, the upper limit αmax2 is set to a value that is slightly larger than a value obtained by subtracting the warning issuance threshold Pa1 from the recommended set pressure Pr. Thus, the occurrence of the circumstances where a warning ends in running at high speed despite the issuance of the warning during stoppage of the vehicle can be avoided.

Figure 7:
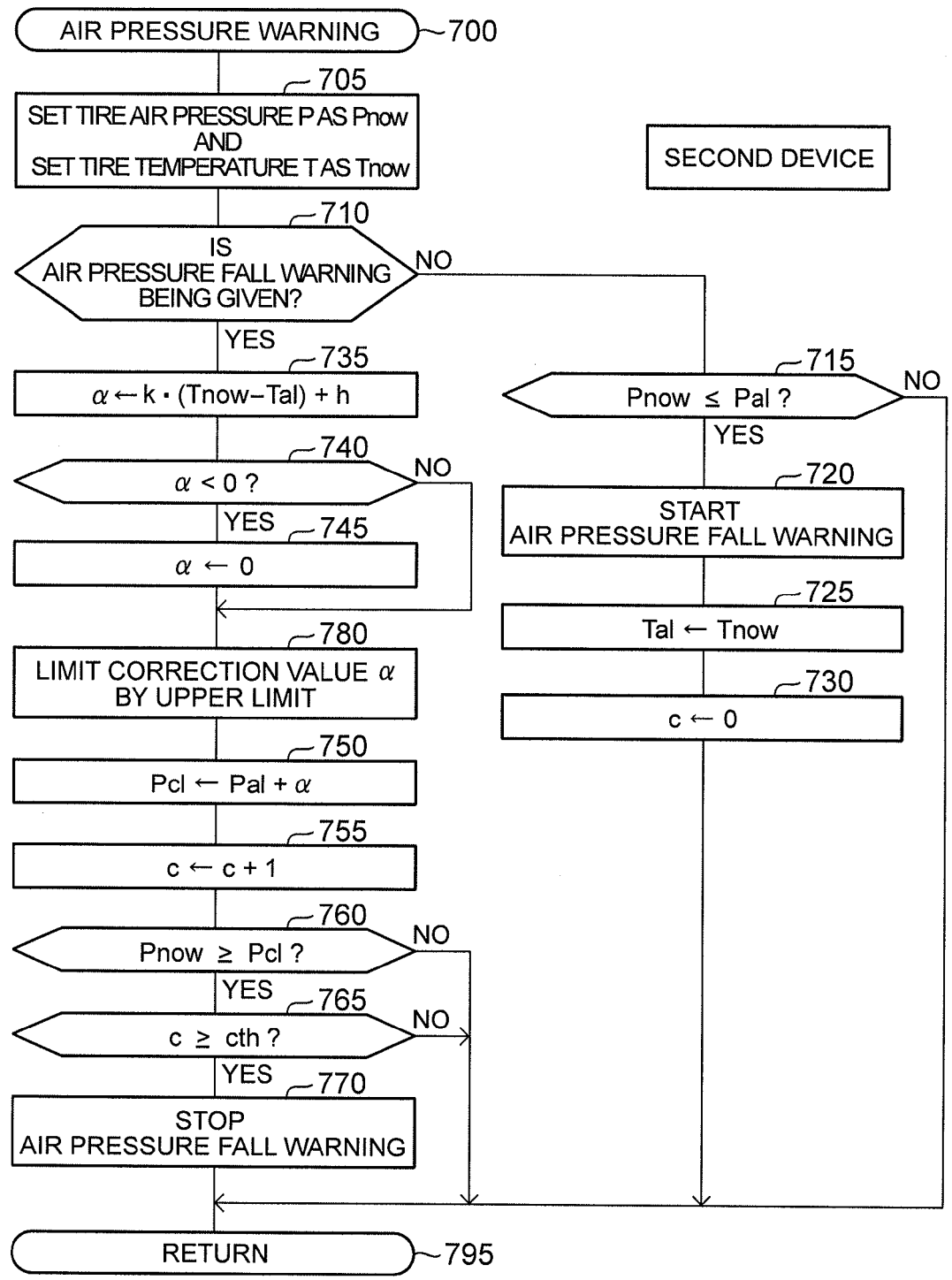
FIG. 7 is a flowchart showing "an air pressure warning routine" that is executed by an ECU of the second device.

Next, the concrete operation of the second device will be described. The CPU of the ECU 30 of the second device executes "an air pressure warning routine" shown in FIG. 7 in the form of a flowchart, every time a constant length of time elapses. The CPU realizes the function of the annunciation control unit 33 by executing this routine. The flowchart of FIG. 7 is different from the flowchart of FIG. 5 in that step 780 is added to the flowchart of FIG. 5. That is, steps 705 to 770 are the same processing procedures as steps 505 to 570 respectively. Accordingly, the processing procedure of step 780 will be described hereinafter.

Figure 8:
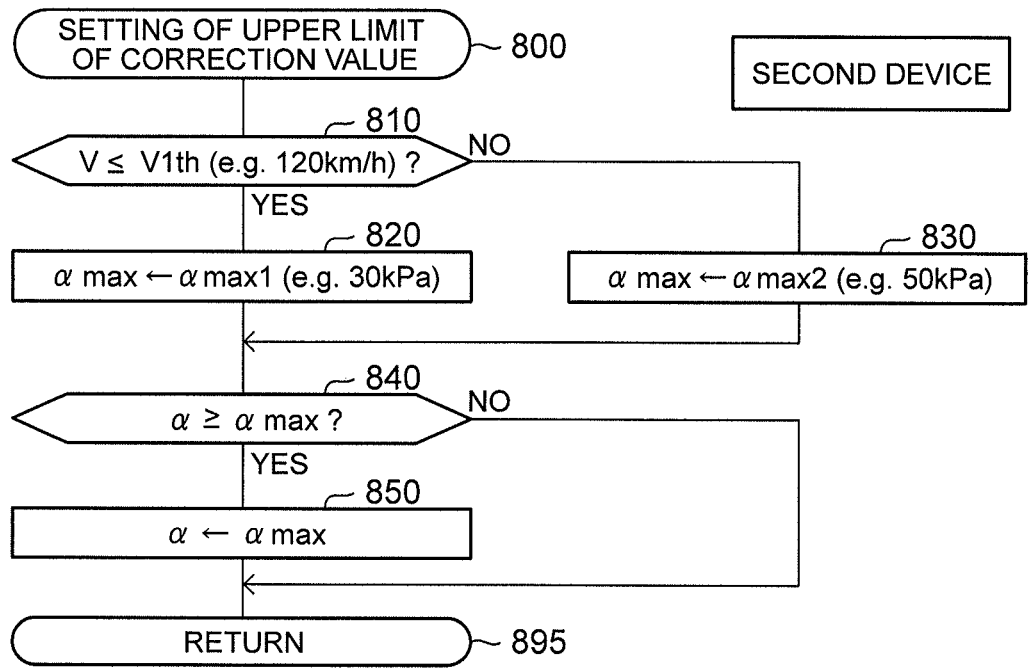
FIG. 8 is a flowchart showing "a correction value upper limit setting routine" that is executed by the ECU of the second device.

Upon proceeding from one of steps 740 and 745 to step 780, the CPU sets an upper limit (αmax1 or αmax2) for the correction value α by executing a subroutine shown in FIG. 8.

That is, upon proceeding to step 780, the CPU proceeds to step 810 via step 800 in the routine of FIG. 8 to determine whether or not the vehicle speed V is equal to or lower than the first predetermined vehicle speed V1th. If the vehicle speed V is equal to or lower than the first predetermined vehicle speed V1th, the CPU regards the result of the determination in step 810 as "Yes", and proceeds to step 820 to set the first difference upper limit αmax1 as the upper limit αmax for the correction value α. In contrast, if the vehicle speed V is higher than the first predetermined vehicle speed V1th, the CPU regards the result of the determination in step 810 as "No", and proceeds to step 830 to set the second difference upper limit αmax2 as the upper limit αmax for the correction value α.

The CPU proceeds from step 820 or step 830 to step 840 to determine whether or not the correction value α is equal to or larger than the upper limit αmax. If the correction value α is equal to or larger than the upper limit αmax, the CPU regards the result of the determination in step 840 as "Yes", and proceeds to step 850 to set the correction value α to the upper limit αmax. After that, the CPU proceeds to step 750 of FIG. 7 via step 895. In contrast, if the correction value α is not equal to or larger than the upper limit αmax, the CPU regards the result of the determination in step 840 as "No", directly proceeds to step 895, and then proceeds to step 750 of FIG. 7. The foregoing is the concrete operation of the second device.

As is understood from the foregoing, according to the second device, a warning is not continued when the tire air pressure becomes excessively high with respect to the recommended set pressure Pr. Therefore, the tire air pressure can be prevented from being adjusted in such a manner as to become excessively high. Furthermore, the possibility of occurrence of the circumstances where a warning ends in running at high speed despite the issuance of the warning during stoppage of the vehicle can be reduced. In consequence, the possibility of the driver developing a feeling of strangeness can be reduced.

Third Embodiment

Next, a tire air pressure monitoring device according to the third embodiment of the disclosure (hereinafter referred to as "the third device") will be described. The third device is different from the first device only in that an upper limit is provided for the warning cancellation threshold Pc1 itself. This difference will be described hereinafter.

The third device acquires and stores a tire air pressure Pinit at the time of an adjustment of the tire air pressure. The tire air pressure Pinit will be referred to hereinafter as an adjustment air pressure Pinit in some cases. Then, the third device sets an upper limit Pc1max1 for the warning cancellation threshold Pc1 when the vehicle speed V is equal to or lower than a second predetermined vehicle speed V2th (e.g., 120 (km/h)) (i.e., sets the warning cancellation threshold Pc1 to the upper limit Pc1max1 when the warning cancellation threshold Pc1 is equal to or larger than the upper limit Pc1max1). The upper limit Pc1max1 is also referred to as "a first cancellation threshold upper limit Pc1max1" for the sake of convenience. The first cancellation threshold upper limit Pc1max1 is set to a value (=Pinit−β) obtained by subtracting a positive constant value β (e.g., 10 (kPa)) from the adjustment air pressure Pinit, as indicated by an expression (4) shown below. Incidentally, β may be equal to "0".

$$Pc1max1 = Pinit - \beta (kPa) \text{ (the vehicle speed } V \text{ the second predetermined speed } V2th) \quad (4)$$

Furthermore, the third device sets the upper limit Pc1max2 for the warning cancellation threshold Pc1 when the vehicle speed V is higher than the second predetermined vehicle speed V2th (i.e., sets the warning cancellation threshold Pc1 to the upper limit Pc1max2 when the warning cancellation threshold Pc1 is equal to or larger than the upper limit Pc1max2). The upper limit Pc1max2 is also referred to as "a second cancellation threshold upper limit Pc1max2" for the sake of convenience. The second cancellation threshold upper limit Pc1max2 is set to the adjustment air pressure Pinit, as indicated by an expression (5) shown below.

$$Pc1max2 = Pinit(kPa) \text{ (the vehicle speed } V > \text{the second predetermined speed } V2th) \quad (5)$$

According to the third device, the circumstances where a warning continues even in the case where the tire air pressure becomes equal to a value in the vicinity of the tire air pressure that has just been adjusted at the time of an immediately preceding adjustment of the tire air pressure (i.e., the adjustment air pressure Pinit) can be avoided. In consequence, the circumstances where the driver develops a feeling of strangeness can be avoided. Furthermore, since the tire temperature is likely to become high at the time of high-speed running when the vehicle speed V exceeds the second predetermined vehicle speed V2th, the adjustment air pressure Pinit is exceeded in some cases although the air in the tire actually leaks. For this reason, the second cancellation threshold upper limit Pc1max2 is set to the adjustment air pressure Pinit that is equal to or higher than the first cancellation threshold upper limit Pc1max. Thus, the occurrence of the circumstances where a warning ends in running at high speed despite the issuance of the warning during stoppage of the vehicle can be avoided.

Next, the concrete operation of the third device will be described. The CPU of the ECU 30 of the third device executes "an adjustment air pressure storage routine" shown in FIG. 9 in the form of a flowchart, every time a constant length of time elapses.

Figure 9:
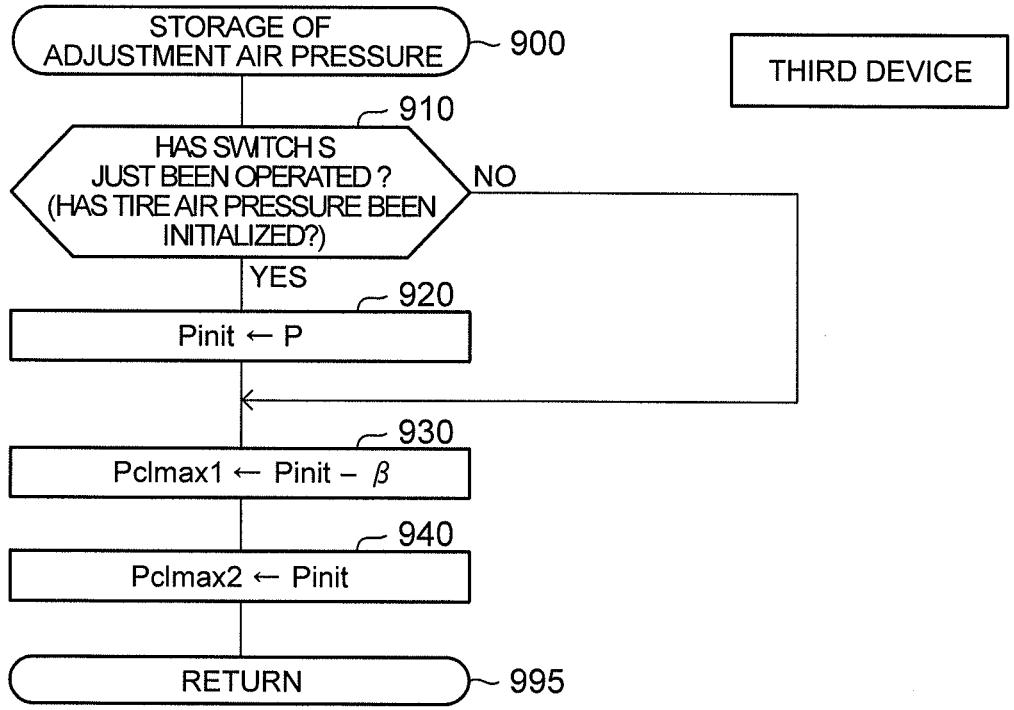
FIG. 9 is a flowchart showing "an adjustment air pressure storage routine" that is executed by an ECU of a tire air pressure monitoring device (a third device) according to the third embodiment of the disclosure.

Accordingly, with the advent of a predetermined timing, the CPU starts the process from step 900 of FIG. 9, and proceeds to step 910 to determine whether or not the touch-type switch S on the tire air pressure monitoring screen D displayed by the display of the annunciator 40 has just been operated. The operator is commanded to operate this switch S when the tire air pressure P is adjusted.

If the switch S has just been operated at the current moment, the CPU regards the result of the determination in step 910 as "Yes", and proceeds to step 920 to acquire the tire air pressure P at that moment as the adjustment air pressure Pinit and store the acquired adjustment air pressure Pinit into the non-volatile memory. After that, the CPU proceeds to step 930. In contrast, if the switch S has not just been operated at the current moment, the CPU regards the result of the determination in step 910 as "No", and directly proceeds to step 930.

In step 930, the CPU sets the first cancellation threshold upper limit Pc1max1 to "a value (=Pinit−β) obtained by subtracting the constant value β from the adjustment air pressure Pinit". Subsequently, the CPU proceeds to step 940 to set the second cancellation threshold upper limit Pc1max2 to "the adjustment air pressure Pinit". After that, the CPU temporarily ends the present routine.

Figure 10:
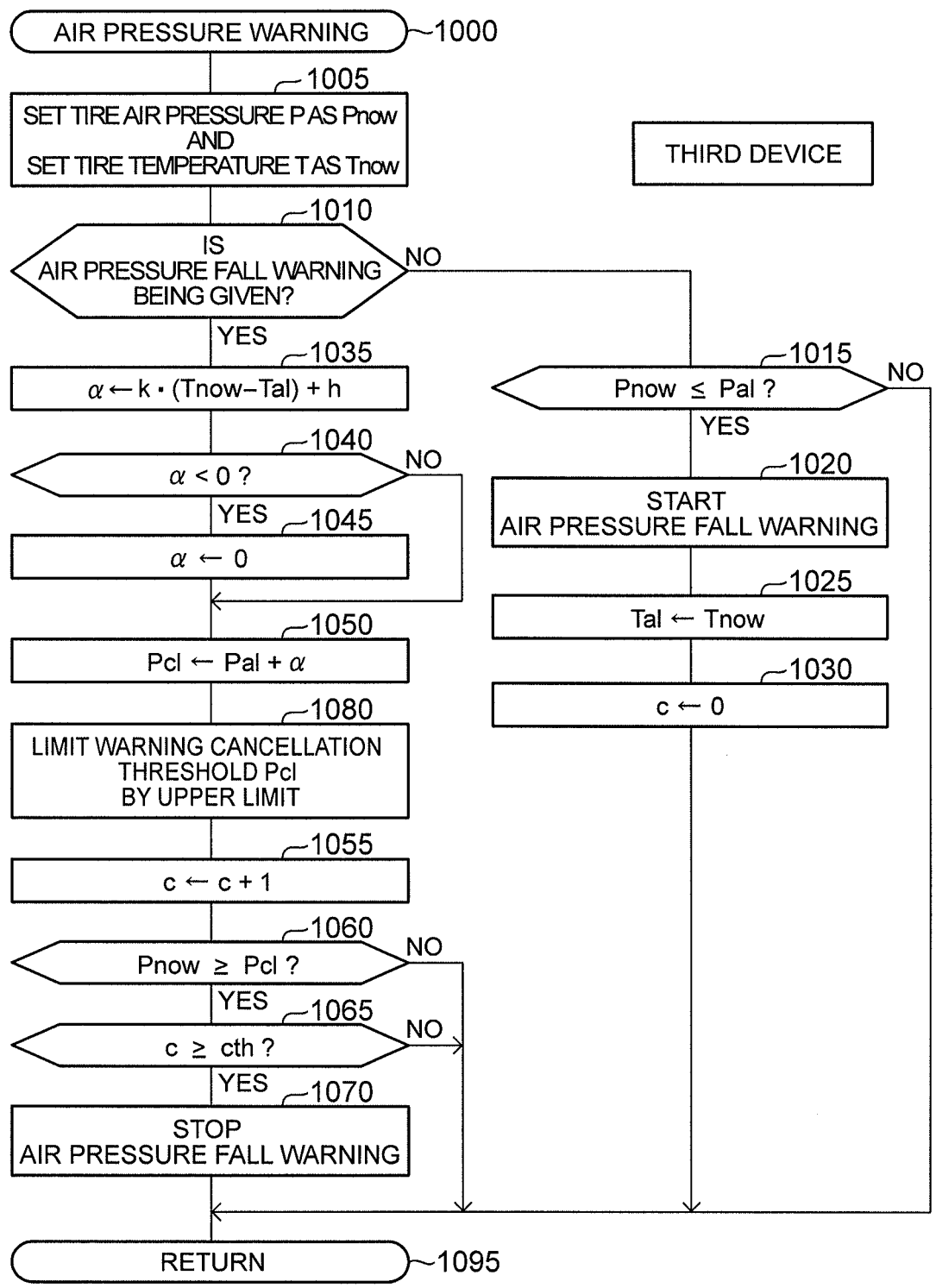
FIG. 10 is a flowchart showing "an air pressure warning routine" that is executed by the ECU of the third device.

Furthermore, the CPU of the ECU 30 of the third device executes "an air pressure warning routine" shown in FIG. 10 in the form of a flowchart, every time a constant length of time elapses. The CPU realizes the function of the annunciation control unit 33 by executing this routine. The flowchart of FIG. 10 is different from the flowchart of FIG. 5 in that step 1080 is added to the flowchart of FIG. 5. That is, steps 905 to 970 are the same processing procedures as steps 505 to 570 respectively. Accordingly, the processing procedure of step 1080 will be described hereinafter.

Figure 11:
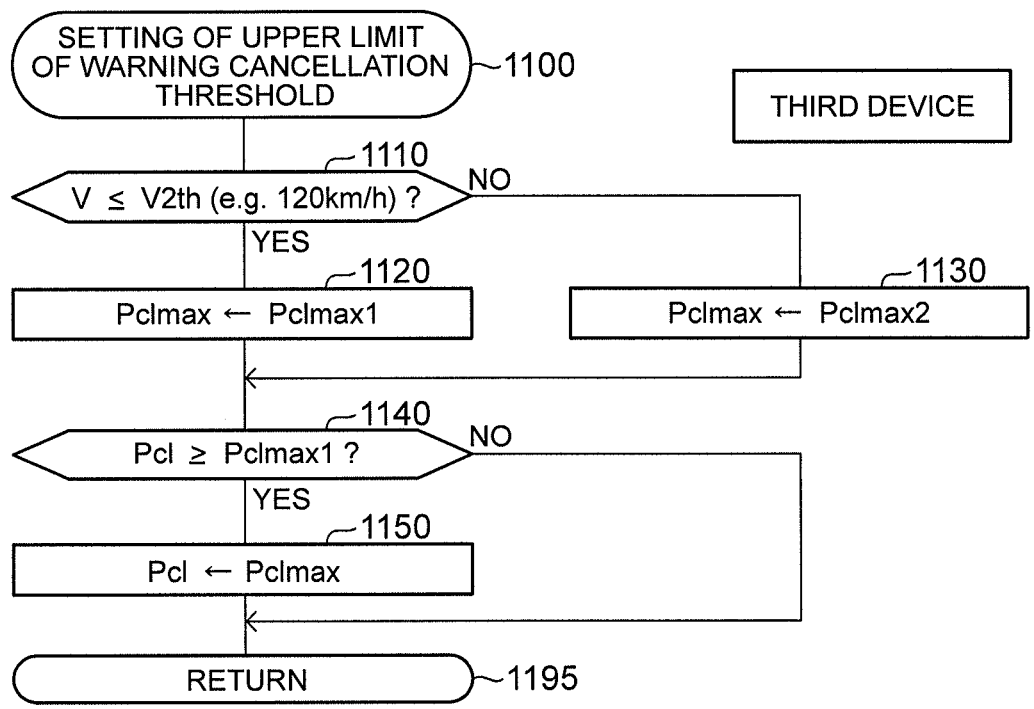
FIG. 11 is a flowchart showing "a warning cancellation threshold upper limit setting routine" that is executed by the ECU of the third device.
Figure 12:
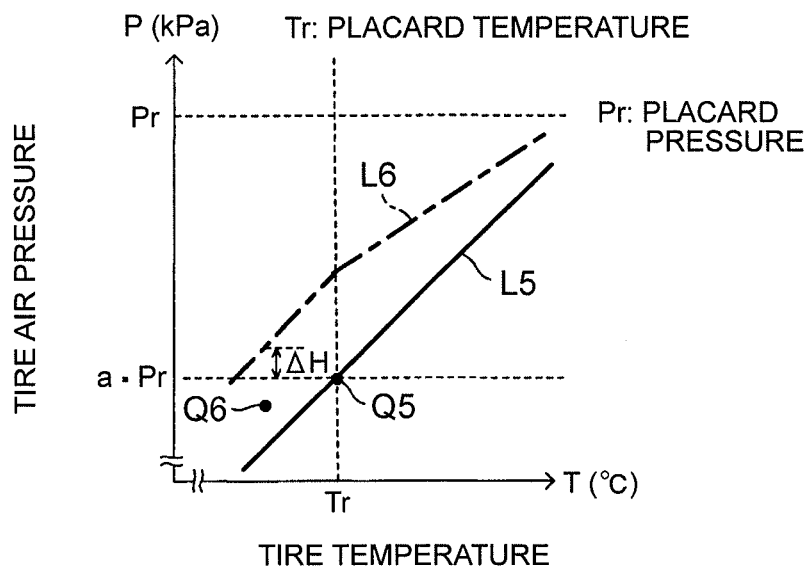
FIG. 12 is a graph showing a relationship between "a warning issuance threshold and a warning cancellation threshold" that are set by a conventional tire air pressure monitoring device and a tire temperature.

Upon proceeding from step 1050 to step 1080, the CPU sets the upper limits (Pc1max1 and Pc1max2) for the warning cancellation threshold Pc1 by executing a subroutine shown in FIG. 11.

That is, upon proceeding to step 1080, the CPU proceeds to step 1110 via step 1100 in the routine of FIG. 11 to determine whether or not the vehicle speed V is equal to or lower than the second predetermined vehicle speed V2th. If the vehicle speed V is equal to or lower than the second predetermined vehicle speed V2th, the CPU regards the result of the determination in step 1110 as "Yes", and proceeds to step 1120 to set the first cancellation threshold upper limit Pc1max1 (=Pinit−β) as the upper limit Pc1max of the warning cancellation threshold Pc1. In contrast, if the vehicle speed V is higher than the second predetermined vehicle speed V2th, the CPU regards the result of the determination in step 1110 as "No", and proceeds to step 1130 to set the second cancellation threshold upper limit Pc1max2 (=Pinit) as the upper limit Pc1max of the warning cancellation threshold Pc1.

The CPU proceeds from step 1120 or step 1130 to step 1140 to determine whether or not the warning cancellation threshold Pc1 is equal to or larger than the upper limit Pc1max. If the warning cancellation threshold Pc1 is equal to or larger than the upper limit Pc1max, the CPU regards the result of the determination in step 1140 as "Yes", and proceeds to step 1150 to set the warning cancellation threshold Pc1 to the upper limit Pc1max. After that, the CPU proceeds to step 1055 of FIG. 10 via step 1195. In contrast, if the warning cancellation threshold Pc1 is not equal to or larger than the upper limit Pc1max, the CPU regards the result of the determination in step 1140 as "No", directly proceeds to step 1195, and then proceeds to step 1055 of FIG. 10. The foregoing is the concrete operation of the third device.

As is understood from the foregoing, according to the third device, the circumstances where a warning continues even in the case where the tire air pressure becomes equal to a value in the vicinity of the tire air pressure that has just been adjusted at the time of the immediately preceding adjustment of the tire air pressure (i.e., the adjustment air pressure Pinit) can be avoided. In consequence, the circumstances where the driver develops a feeling of strangeness can be avoided. Furthermore, the possibility of occurrence of the circumstances where a warning ends in running at high speed despite the issuance of the warning during stoppage of the vehicle can be reduced. In consequence, the possibility of the driver developing a feeling of strangeness can be reduced.

As described above, in accordance with the tire air pressure monitoring device according to each of the embodiments of the disclosure, the warning issuance threshold Pa1 (the first threshold Pa1) is a constant value unrelated to the tire temperature T. Therefore, even in the case where the tire temperature is very low, a warning can be issued without delay when the tire air pressure P becomes equal to or lower than the warning issuance threshold Pa1. Furthermore, even in the case where the tire air pressure P rises due to a rise in the tire temperature T with the adjustment of the tire air pressure P not carried out, the tire air pressure P does not exceed the warning cancellation threshold Pc1 (the second threshold Pc1). Therefore, the possibility of frequent occurrence of the issuance and stop of a warning as a result of the running of the vehicle can be reduced. In addition, even in the case where the tire temperature T is low, the difference between the warning cancellation threshold Pc1 and the warning issuance threshold Pa1 is equal to or larger than the positive constant value h as long as the tire temperature T is equal to or higher than the tire temperature at the time of the issuance of a warning (the warning issuance temperature Ta1). Therefore, the possibility of frequent occurrence of the issuance and cancellation of a warning can be reduced.

The disclosure is not limited to the aforementioned embodiments thereof. Various modification examples can be adopted within the scope of the disclosure. For example, the air pressure fall warning may be given acoustically or vocally.

Furthermore, according to the aforementioned expression (3), the correction value a is a variable value obtained by adding the positive constant value h to the value k·(Tnow−Ta1), which increases as the temperature difference (Tnow−Ta1) obtained by subtracting the warning issuance temperature Ta1 from the tire temperature Tnow at the current moment increases. However, the correction value α may be a value expressed by a general expression (6) shown below.

$$\alpha = f(Tnow - Ta1) + h \tag{6}$$

It should be noted herein that the function f(T) is a function that monotonically increases with respect to a variable T. That is, the function f(T) is a function in which an expression (7) shown below is satisfied.

$$df(T)/dT > 0 \tag{7}$$

The function f(T) may be a function that is realized by measuring in advance an amount of rise in the actual tire air pressure when the tire temperature rises from any temperature by unit temperature, and storing the relationship into the ROM in the manner of a look-up table.

As shown in FIG. 4, the lower limit of the warning cancellation threshold Pa is the warning issuance threshold Pa1. However, the lower limit of the warning cancellation threshold Pc1 may be a value that is larger than the warning issuance threshold Pa1 and that is equal to or smaller than the sum (Pa1+h) of the warning issuance threshold Pa1 and the hysteresis h.

Furthermore, the second device and the third device may be used in combination with each other. That is, an upper limit may be provided for the correction value α, and an upper limit may also be provided for the warning cancellation threshold Pc1 itself.

Incidentally, in each of the aforementioned embodiments of the disclosure, the attachment position of each of the sensor units (the wheel position) is specified by a corresponding one of the sensor ID's included in the wheel information. However, the tire air pressure monitoring device according to the disclosure may be configured to cause the annunciator to display only the warning mark without specifying each of the wheel positions.

What is claimed is:

1. A tire air pressure monitoring device comprising:
   an air pressure sensor that detects a tire air pressure as an air pressure of a tire of a vehicle;
   a temperature sensor that detects a tire temperature as a temperature of the tire; and
   a warning control unit that is configured to
   start giving a driver a warning that the tire air pressure has fallen, when the detected tire air pressure is equal to or lower than a first threshold that is a constant value unrelated to the detected tire temperature,
   acquire the tire temperature detected at a moment of start of the warning, as a warning issuance temperature,
   set a value obtained by adding a variable value, which is obtained by adding a positive constant value to a value that increases as a temperature difference obtained by subtracting the warning issuance temperature from the currently detected tire temperature increases, to the first threshold, as a second threshold, and
   stop the warning when the detected tire air pressure becomes equal to or higher than the second threshold in a case where the warning is being given.

2. The tire air pressure monitoring device according to claim 1, wherein
   the warning control unit is configured to limit the second threshold such that a difference value obtained by subtracting the first threshold from the second threshold does not become equal to or larger than a first difference upper limit when a speed of the vehicle is equal to or lower than a predetermined speed, and limit the second threshold such that the difference value does not become equal to or larger than a second difference upper limit that is larger than the first difference upper limit when the speed of the vehicle is higher than the predetermined speed.

3. The tire air pressure monitoring device according to claim 1, wherein
   the warning control unit is configured to acquire the detected tire air pressure as an adjustment air pressure when the air pressure of the tire is adjusted, and limit the second threshold such that the second threshold does not become equal to or larger than an upper limit that is determined based on the acquired adjustment air pressure.

4. The tire air pressure monitoring device according to claim 1, wherein
   the warning control unit is configured to continue the warning instead of stopping the warning regardless of the detected tire air pressure, until a predetermined time lapses from start of the warning.

* * * * *